(No Model.) 2 Sheets—Sheet 1.

P. VAN GELDER.
MACHINE FOR SEPARATING DUST FROM AIR.

No. 602,964. Patented Apr. 26, 1898.

Witnesses
C. C. Binding
D. E. Binding

Inventor:
Pieter van Gelder,
by Dodge and Sons,
Attorneys

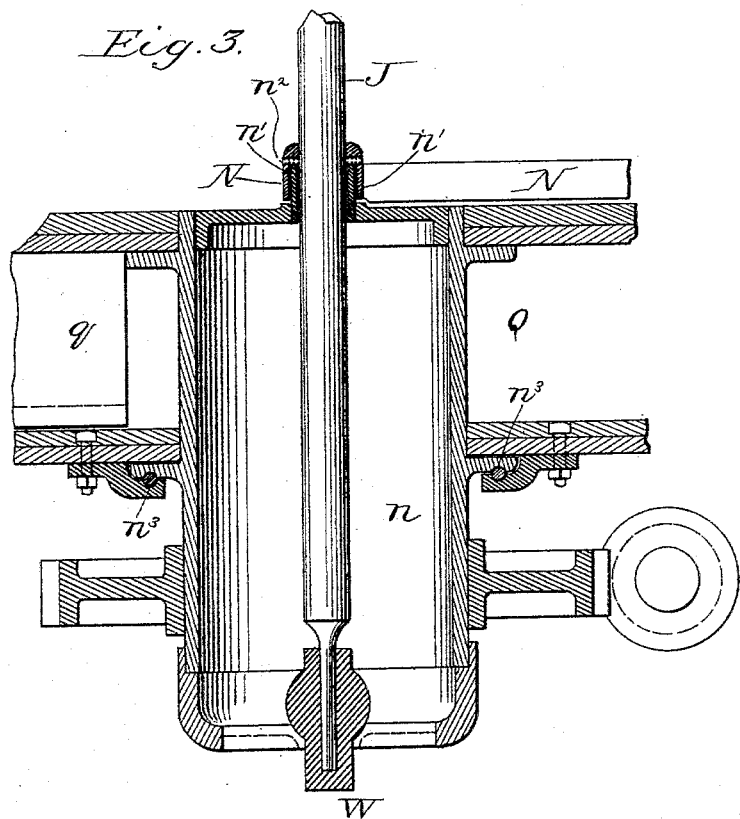

UNITED STATES PATENT OFFICE.

PIETER VAN GELDER, OF SOWERBY BRIDGE, ENGLAND, ASSIGNOR TO WILLIAM PHILLIPS THOMPSON, OF LIVERPOOL, ENGLAND.

MACHINE FOR SEPARATING DUST FROM AIR.

SPECIFICATION forming part of Letters Patent No. 602,964, dated April 26, 1898.

Application filed September 3, 1896. Serial No. 604,776. (No model.) Patented in France December 9, 1891, No. 217,941.

*To all whom it may concern:*

Be it known that I, PIETER VAN GELDER, milling engineer, a subject of the Queen of Great Britain, residing at Sowerby Bridge, in the county of York, England, have invented certain new and useful Improvements in Machines for Separating Dust from Air, (patented in France under a patent of addition, dated January 14, 1896, to original patent No. 217,941, dated December 9, 1891,) of which the following is a specification.

This invention has for its object an improvement on that type of dust-collectors for which I have obtained numerous Letters Patent, more especially Nos. 479,231, 479,267, 522,700, and 522,769. It is best described by aid of the accompanying drawings, in which—

Figure 1:
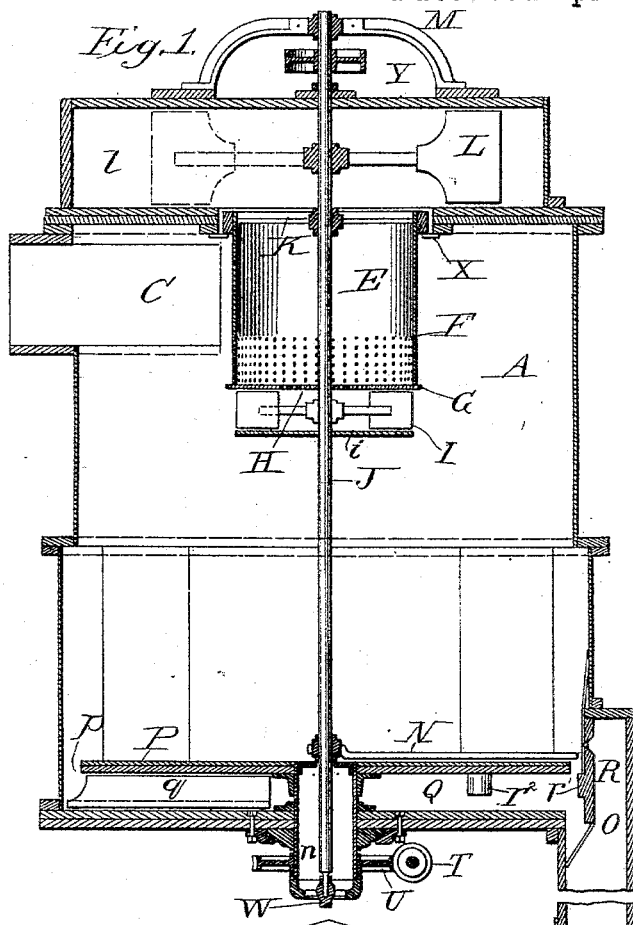
Figure 2:
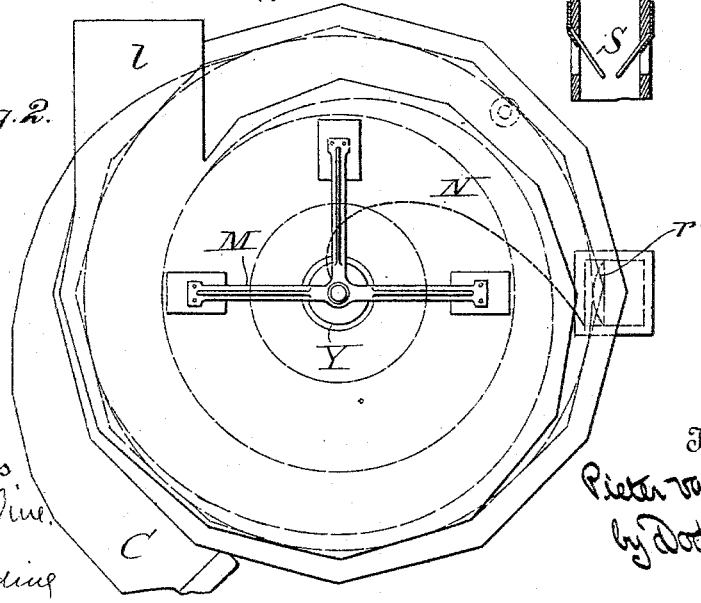

Figure 1 is a vertical section, and Fig. 2 a plan, of my latest improved apparatus; and Fig. 3, a vertical section, on a larger scale, of the sleeve $n$ and contiguous parts.

In the drawings, A is a cylindrical separating-chamber; B, a polygonal extension of this chamber below. After many experiments I have found that this arrangement is superior to either an entirely cylindrical chamber or an entirely polygonal one, that while the air and dust are separating it is well to have a smooth cylindrical wall with as little sudden change of the direction of the current as possible, but that when the dust has practically separated from the air it is well that the air should be deflected from one side to the next, and so on, instead of continuing to travel along with the dust, the air in this instance striking each side in succession and being deflected to the next side bridging over the intermediate space, but the dust, having greater centrifugal force, passes on into the corners and there collects and gradually descends to the bottom.

C is an entrance for the dusty air. This in vortex-machines hitherto has been made tangential to the cylinder A or its equivalent. I have found, however, that by making it tangential to the cylinder a wave is caused through the sudden increment of air at one point. I therefore form the spout of a curved or polygonal form, gradually entering into the circle of cylinder A through a large arc of that circle, so that there shall be no sudden inflex of air into the circular portion of the chamber, but it shall gradually enter it, the outer wall of the orifice gradually approaching the circle of chamber A through a considerable arc of that circle.

E is the usually dependent exit from the chamber, usually made either cylindrical, conical, pyramidal, or polygonal. In the arrangement shown it is cylindrical, and for the purpose for which this particular machine was designed the cylinder is preferable. It differs from dependent outlets that have gone before in that the upper part of the walls only is imperforate, and at a given point F it begins to be perforate all around, the perforations being near together and about one-eighth inch in diameter. The bottom is a circular disk G, extending a little beyond the walls of this dependent exit, and it is perforate only in the central portion marked H. Below it is placed a fan or flyers I. This fan, when there is no fan above also to be driven, is preferably driven by the action of the rotating air in the machine. In the present instance, however, it is shown keyed to the central shaft J, which shaft is driven in any convenient manner, (not shown,) such as by a pulley Y on top. Beneath the fan I is a disk $i$. This disk is imperforate. The chamber E is likewise attached by skeleton arms K to the shaft J and revolves with it and has an annular valve X, of leather lined with flannel, closing the annular crack between it and the framework of the machine and thus preventing air escaping or entering at this point. The annular valve can be attached either to the moving or stationary part, preferably the latter. The spindle J is carried by a step W at the bottom and by bearings in a bracket M at the top.

L is a fan used for drawing the air through the machine and delivering it at spout $l$, Fig. 1.

M is a bracket carrying the bearings of shaft J.

N is a stationary volute scraper (shown in Fig. 1 and in dotted lines only in Fig. 2) for scraping any dust which falls on the floor of chamber B into annular orifice $p$. It has an eye loosely encircling a gas-pipe continuation of the sleeve $n$ and is bolted, screwed, or nailed at the other end to the walls of the polygonal chamber. Its attachment is best shown by Fig. 3.

$a$ is a plate closing the top of sleeve $n$, except for a small vertical pipe $n'$ around shaft J. On shaft J slides a weighted leather washer $n^2$, closing the crack between the shaft and the gas-pipe $n'$. The sleeve $n$ carries the bearing W of shaft J and in large machines is carried on ball-bearings $n^3$, as shown in Fig. 3.

P is a disk forming the bottom of chamber B and having an inlet-opening $p$ around it into the chamber Q. In this chamber Q a scraper $q$, of any convenient form, attached to the revolving sleeve N, scrapes the material which falls through the orifice $p$ until it arrives in the spout O. The spout O can be formed open; but I prefer a balanced valve R, ordinarily kept closed by gravity or a spring in the hinge at $r$. This valve has a curved projecting piece $r'$, acting as a cam, and on the rotating disk P is a roller $r^2$. This roller each time it comes around presses back and thus opens the valve and allows the material already collected above it by scrapers N and $q$ to fall into spout O. Below this valve, near the bottom of the spout, are two flexible elastic valves S. These ordinarily stand slightly open and open farther and allow any accumulation of material to pass; but when valve R is open the pressure of the air below valves S closes them till the valve R is again closed and till sufficient material has fallen to automatically cause them to open and allow the weight of material to pass.

T is a worm, and U a worm-wheel, attached to cylinder $n$ and thus driving the plate P and the scraper $q$. In the actual machine from which this is a drawing the worm revolves at seventy and plate P about two revolutions a minute. The speed of the shaft J is regulated by the speed at which the fan L is to travel, and this differs for nearly all kinds of dust. In a machine about five feet six inches internal diameter it is about four hundred and fifty revolutions when used for mill-dust. The fan L is in any case not a necessity, as frequently the air is forced into the machine instead of drawn out of it, and in other cases there is a simple vent, flue, or chimney from the orifice E up to the chimney, or the orifice is simply left open.

The bottom of chamber Q is fixed and attached to the walls of chamber B.

The mode of action of the machine is as follows: The dusty air is drawn in by fan L or can be forced or drawn in in any other usual and convenient manner. It entering approximately tangentially forms a vortex in the manner well known, the dust separating in the extreme outside and the air entering the outlet E through the lateral perforations below F. Some extremely fine dust going through with the air settles on the disk G and then passes out through the perforations H into the fan I and is discharged again into the vortex of dusty air. The disk G is made rather wider than chamber E to prevent this dust from passing around and returning through the lateral perforations. There is an impervious disk $i$ below the fan I, so as to prevent the ascending central current from entering said fan or passing through to chamber E. Chamber E can thus only be entered laterally.

I claim as my invention—

1. In combination with a substantially cylindrical outlet E of a dust-separating chamber; a terminal disk G extending somewhat beyond the dependent outlet, and finely perforated near the center, and closing the mouth of said orifice except for said perforations near the center, and fan I for discharging the dusty air in the chamber E through the perforations of the disk.

2. In combination with a dust-separating chamber in which the dusty air forms a vortex, a dependent outlet E caused to rotate with the revolving air, substantially as described.

3. The combination with a dust-separating chamber in which the dusty air forms a vortex of a dependent rotating outlet perforated only near the bottom and floored with a perforated disk substantially as described.

4. In a dust-separating chamber in which the dusty air forms a vortex, the combination of a rotatable dependent exit E with fan-blades I rotating with the effluent air and means for maintaining the axes of rotation in the vertical line.

5. In combination with a dust-separating chamber in which the dusty air forms a vortex, the combination of rotating outlet E perforated on its sides, a floor for said outlet perforated in the center, a fan below rotating with the outlet and the vortex of dusty air, and a disk below, preventing the uprising central current from entering.

6. In a dust-separating apparatus, a separating-chamber in which the dusty air forms a vortex formed cylindrical in its upper part and polygonal in its lower part, substantially as described.

7. In combination with a vortex dust-collector having a rotating scraper and exit-spout, a rotating tappet $V'$ and valve R having an internal projecting surface $V^2$ whereby it is periodically opened.

In testimony whereof I have signed my name to this specification in the presence of two subscribing witnesses.

P. VAN GELDER.

Witnesses:
 WM. P. THOMPSON,
 W. H. BEESTON.